United States Patent
Karipides et al.

(10) Patent No.: US 10,592,852 B1
(45) Date of Patent: Mar. 17, 2020

(54) DETERMINING RECOMMENDED ORDERS FOR CONFIGURABLE PRODUCTS ON A MULTI-DIMENSIONAL BASIS

(75) Inventors: Daniel P. Karipides, Round Rock, TX (US); David R. Middleton, Austin, TX (US); Andrew S. Price, Austin, TX (US)

(73) Assignee: Versata Development Group, Inc., Austin, TX (US)

( * ) Notice: Subject to any disclaimer, the term of this patent is extended or adjusted under 35 U.S.C. 154(b) by 2382 days.

(21) Appl. No.: 11/216,607

(22) Filed: Aug. 31, 2005

Related U.S. Application Data

(60) Provisional application No. 60/700,109, filed on Jul. 18, 2005.

(51) Int. Cl.
    *G06Q 10/08* (2012.01)
    *G06Q 10/02* (2012.01)

(52) U.S. Cl.
    CPC .......... *G06Q 10/087* (2013.01); *G06Q 10/02* (2013.01)

(58) Field of Classification Search
    None
    See application file for complete search history.

(56) References Cited

U.S. PATENT DOCUMENTS

| | | | | |
|---|---|---|---|---|
| 5,745,765 A | * | 4/1998 | Paseman | G06F 17/50 717/107 |
| 5,974,395 A | * | 10/1999 | Bellini et al. | 705/9 |
| 6,470,324 B1 | * | 10/2002 | Brown et al. | 705/28 |
| 6,675,151 B1 | * | 1/2004 | Thompson | G06Q 10/06311 705/7.14 |
| 6,711,550 B1 | * | 3/2004 | Lewis et al. | 705/7.31 |
| 7,188,075 B1 | * | 3/2007 | Smirnov | G06Q 10/06 705/7.35 |
| 7,392,197 B1 | * | 6/2008 | Fliess | G06Q 10/10 705/319 |
| 7,471,990 B2 | * | 12/2008 | Hotta | G06Q 10/06 700/107 |
| 2002/0010655 A1 | * | 1/2002 | Kjallstrom | G06Q 30/02 705/26.62 |
| 2005/0060242 A1 | * | 3/2005 | Armstrong et al. | 705/28 |
| 2005/0159997 A1 | * | 7/2005 | John | G06Q 10/06315 705/7.31 |

* cited by examiner

*Primary Examiner* — Fateh M Obaid
(74) *Attorney, Agent, or Firm* — Kent B. Chambers; Terrile, Cannatti & Charles LLP

(57) ABSTRACT

A multi-dimensional recommended order system generates recommended orders for configurable products. The multi-dimensional recommended order system generates the recommended orders based on a multi-dimensional demand and sales metrics analysis. The multi-dimensional recommended order system determines the recommended order for each product configuration with a goal of moving a future supply mix of complex products to an optimized target supply mix. The recommended order can be generated and evaluated based on demand analysis of not only configured products but also based on analysis for demand of particular product dimensions. Thus, the system determines a recommended order for each configurable product by minimizing imbalances between future supplies and target supplies of product configurations and future supplies and target supplies of dimensions of the product configurations.

33 Claims, 7 Drawing Sheets

DETERMINING RECOMMENDED ORDERS FOR CONFIGURABLE PRODUCTS ON A MULTI-DIMENSIONAL BASIS

CROSS-REFERENCE TO RELATED APPLICATION

This application claims the benefit under 35 U.S.C. § 119(e) of U.S. Provisional Application No. 60/700,109, filed Jul. 18, 2005 and entitled "Determining Recommended Orders for Configurable Products on a Multi-Dimensional Basis". Provisional Application No. 60/700,109 (referred to herein as the "Recommended Order Provisional Application") includes exemplary systems and methods and is incorporated by reference in its entirety.

BACKGROUND OF THE INVENTION

Field of the Invention

The present invention relates in general to the field of information processing, and more specifically to a system and method for determining recommended orders for configurable products on a multi-dimensional basis.

Description of the Related Art

Businesses regularly generate orders for products based on an analysis of supply and demand. Conventionally, companies have used sales related data such as sales history, current supply data, and new marketing initiatives, to determine future demand forecasts. Based on the future demand forecasts, current supply, current orders, and expected sales, businesses place orders for products. However, often the forecasted demand is inaccurate, and, thus, the orders create a supply that does not correlate well with demand.

It is particularly difficult to determine forecasted demand for configurable products. Configurable products include many families of features (dimensions). For example, a particular vehicle has many dimensions such as drive train, engine, wheels, tires, interior type, interior color, exterior color, and optional features such as entertainment systems, moonroof, towing packages, and other packages. Each of the dimensions can have multiple values, thus, creating an exponential number of possible configurations. Conventional ordering methods are unable to take into consideration the multiple dimensions and dimension values when determining orders.

Manufacturers risk a significant amount of revenue based on forecasted demand. For example, consider a truck manufacturer who builds 25% of the trucks with 4×4 drive trains and 75% with 4×2 drive trains based on an inaccurate forecast. The manufacturer and dealers typically lose a significant amount of money if the actual demand for 4×4 versus 4×2 trucks is more than a few percentage points different than forecasted. Even if the profit margins on 4×4 and 4×2 trucks are the same, a dealer may be forced to discount a 4×4 truck to a buyer who preferred a 4×2 truck and vice versa. Therefore, manufacturers who base manufactured products on forecasted demand place a high value in accurate product demand forecasts.

Unfortunately, consistently forecasting accurate demand remains an elusive goal. In the above example, the truck manufacturer divided truck production between 4×2 trucks and 4×4 trucks. In reality, the set of products is often very large, where each particular factory configuration of a product is considered a separate product. For example, not only do manufacturers forecast drive trains, they also forecast a large number of other configuration dimensions such as exterior and interior colors, engine sizes, body styles, drive trains, seat numbers, option packages, and wheel type. Each of these configuration dimensions has multiple values. The increasing number of configuration dimensions for each product type renders consistently accurate forecasting difficult.

In almost all circumstances, manufactures use actual dealer sales data to forecast demand. However, historically such data is often not a complete predictor of future buying trends. Additionally, developing forecast demand for various configuration dimensions has not been possible primarily because of the complexity of the problem due to the number of variables and the lack of necessary, accurate data. Thus, manufacturers often provide a supply of products that does not match actual demand.

SUMMARY OF THE INVENTION

In one embodiment of the present invention, a method for generating recommended orders for configurable products includes determining a recommended order for each product configuration that optimizes imbalances between future supplies and target supplies of product configurations and future supplies and target supplies of dimensions of the product configurations.

In another embodiment of the present invention, a system for generating recommended orders for configurable product includes a processor and a memory, coupled to the processor. The memory includes code stored therein. The code is executable by the processor for determining a recommended order for each product configuration that optimizes imbalances between future supplies and target supplies of product configurations and future supplies and target supplies of dimensions of the product configurations.

In a further embodiment of the present invention, a computer program product includes code stored therein. The code is executable by a processor for determining a recommended order for each product configuration that optimizes imbalances between future supplies and target supplies of product configurations and future supplies and target supplies of dimensions of the product configurations.

In another embodiment of the present invention, an apparatus for generating recommended orders for configurable products includes means executable by a data processing system for determining a recommended order for each product configuration that optimizes imbalances between future supplies and target supplies of product configurations and future supplies and target supplies of dimensions of the product configurations.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
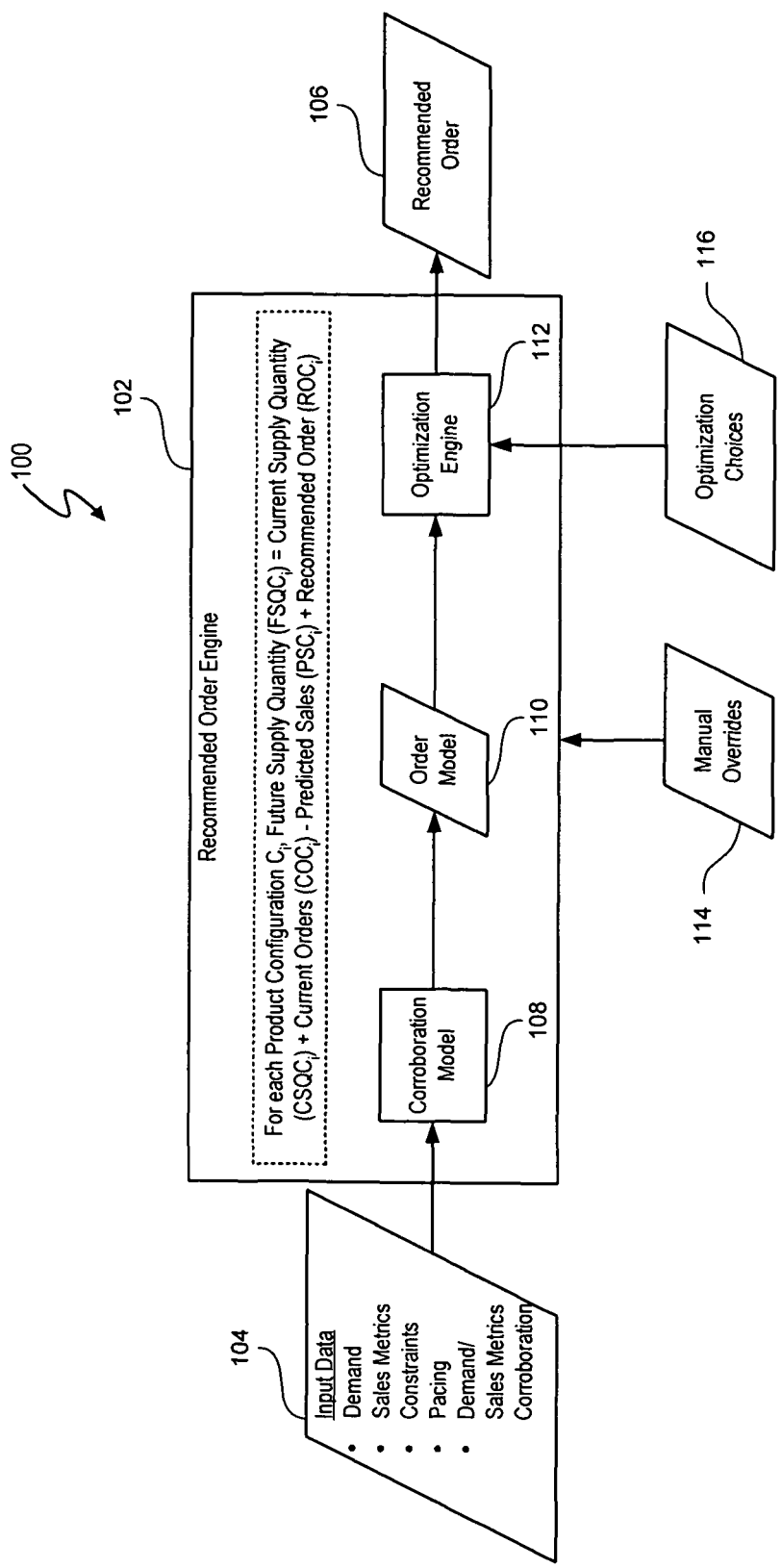
FIG. 1 depicts a multi-dimensional recommended order system.

A multi-dimensional recommended order system generates recommended orders for configurable products. In one embodiment, the multi-dimensional recommended order system generates recommended orders to move a future supply mix of products to an optimized target mix of products, make supply adjustments while maximizing profitability, make an order that is valid, adheres to constraints such as factory, marketing, and regulatory constraints, and make an order that is acceptable to a manufacturer.

The multi-dimensional recommended order system generates orders based on a multi-dimensional demand and sales metrics analysis. Configurable products are generally characterized by multiple configuration options. Each configuration is generally defined by multiple feature families, also referred to as feature dimensions, and each dimension can have one or more possible values. For each product configuration $C_i$:

Future Supply Quantity=Current Supply Quantity+
Order Pipeline−Predicted Sales+Recommended
Order for Product Configuration $C_i$. [Equation 1]

The multi-dimensional recommended order system determines the recommended order for each product configuration and for each dimension available for the product configurations with a goal of moving a future supply mix of complex products to an optimized target supply mix. In general, the multi-dimensional recommended order system determines a target supply mix for each configuration that takes into account factors, such as sales history, sales metrics, and determined demand data, which reflect demand of a product. The multi-dimensional recommended order system determines a target supply mix for each dimension. A target supply mix can be determined in any number of ways such as using (i) a sales metric, (ii) using aggregated sales metrics for dimensions available on various product configurations, (iii) using demand information, and/or using any combination of (i), (ii), and (iii). A recommended order is determined that minimizes imbalances between target and future supply mixes for both product configurations and product dimensions.

The multi-dimensional recommended order system generates a recommended order value (also referred to simply as a "recommended order"). A recommended order can be generated and evaluated based on demand analysis of not only configured products but also based on analysis for demand of particular product dimensions. The multi-dimensional recommended order system utilizes a collection of input data to calculate the recommended order. The input data can include, for example, sales metrics, inventory, actual demand data, order history, future sales volumes, and product configuration data. A corroboration model is used to determine a level of corroboration between sales metrics associated with a product configuration and actual demand data. The level of corroboration can be implemented as a weight and, thus, place relative emphasis on the sales metrics and demand data. The multi-dimensional recommended order system also utilizes constraint data, such as factory, marketing, and regulatory constraints, and pacing algorithms, along with the input data to obtain a recommended order. The constraint data helps ensure that the multi-dimensional recommended order system will generate a realistic order. The multi-dimensional recommended order system utilizes an optimization engine to determine a recommended order from the inputs and constraints in accordance with optimizing selections, such as profitability. In one embodiment, the optimization optimizes imbalances between future supplies and target supplies of product configurations and future supplies and target supplies of multiple dimensions of products by determining a recommended order for each product configuration that minimizes the imbalances. The recommended order can also be determined on a location-by-location basis while still taking into account overall manufacturer goals and constraints.

FIG. 1 depicts a multi-dimensional recommended order system 100. The recommended order engine 102 processes input data 104 and generates a recommended order 106. The recommended order 106 represents an aggregate order for multiple product configurations $C_1, C_2, \ldots, C_n$. Each product configuration $C_i$ in a product has m configurable feature families (dimensions) $D_1 \ldots D_m$, $i \in \{1, 2, \ldots, n\}$, n and m are positive integers, m=number of dimensions for product configuration $C_i$, and the value of m can vary for each product configuration $C_i$, and n=number of configurations. Examples of configurable dimensions in an automotive context are a vehicle's transmission, exterior color, interior color, wheel size, engine size, and special collection of features referred to herein as packages (e.g. sport package, towing package, and luxury package. Each dimension $D_z$ contains j values $d_{z,1}, \ldots, d_{z,j}\}$, where j is a positive integer, j=number of dimension values, and the value of j can vary for each dimension $D_z$, and z is a positive number $z \in \{1, 2, \ldots, m\}$. Example dimension values for a transmission are 4-speed Automatic, 5-speed Automatic, Manual.

The input data 104 can be any collection of data that provides information relevant to determination of the recommended order 106. In at least one embodiment, the input data includes sales metrics, inventory, actual demand data, order history, future sales volumes, and product configuration data. Each configuration $C_i$ is associated with k values of sales metric input data $M_{i,1}, M_{i,2}, \ldots, M_{i,k}$, demand data, and profit margin information $P_{i,1}, P_{i,2}, \ldots, P_{i,k}$. The sales metric data $M_{i,1}, M_{i,2}, \ldots, M_{i,k}$ represents data that provides actual data related to sales of a configuration $C_i$. In at least one embodiment, demand data is used by the recommended order engine 102 in conjunction with the sales metrics to generate an acceptable recommended order 106. A corroboration model represents the relationships between sales metric data and demand data. Example sales metrics are (i) average selling time, (ii) sales efficiency, (iii) inventory age, and (iv) days supply. The average selling time is the number of days taken on average for a product to sell after the product becomes available to a retailer, i.e. Average Selling Time=[sum for each product (Sale Date−Arrival Date with Retailer)]/Total Sales During a Period of Time. Sales Efficiency represents a percentage of retailer available configurations that were sold over a period of time, i.e. Sales Efficiency=Sales/[Dealer Inventory+Sales]. Inventory Age represents a number of days that a current set of retailer available configurations have been available for sale by the retailer, i.e. Inventory Age=[for each car in inventory sum (current date−arrival date)]/number of cars in inventory.

In one embodiment, the demand data represents high resolution demand data determined by the product demand resolution system which is illustratively described in commonly assigned U.S. patent application Ser. No. 10/699,148, filed Oct. 31, 2003, entitled "Identifying Quality User Sessions and Determining Product Demand with High Resolution Capabilities", inventor Daniel P. Karipides (referred to herein as the "Karipides Patent"). The demand data provides actual consumer demand data for each product configuration $C_i$ with specific configuration dimension values.

The constraint data represents constraints on ordering one or more product configurations. For example, a factory may be constrained so that only X % of the total production volume can be of product configuration $C_i$.

Future sales volume represents the anticipated volume of products available for sale. This information is generally obtained from the manufacturer of the product.

Figure 2:
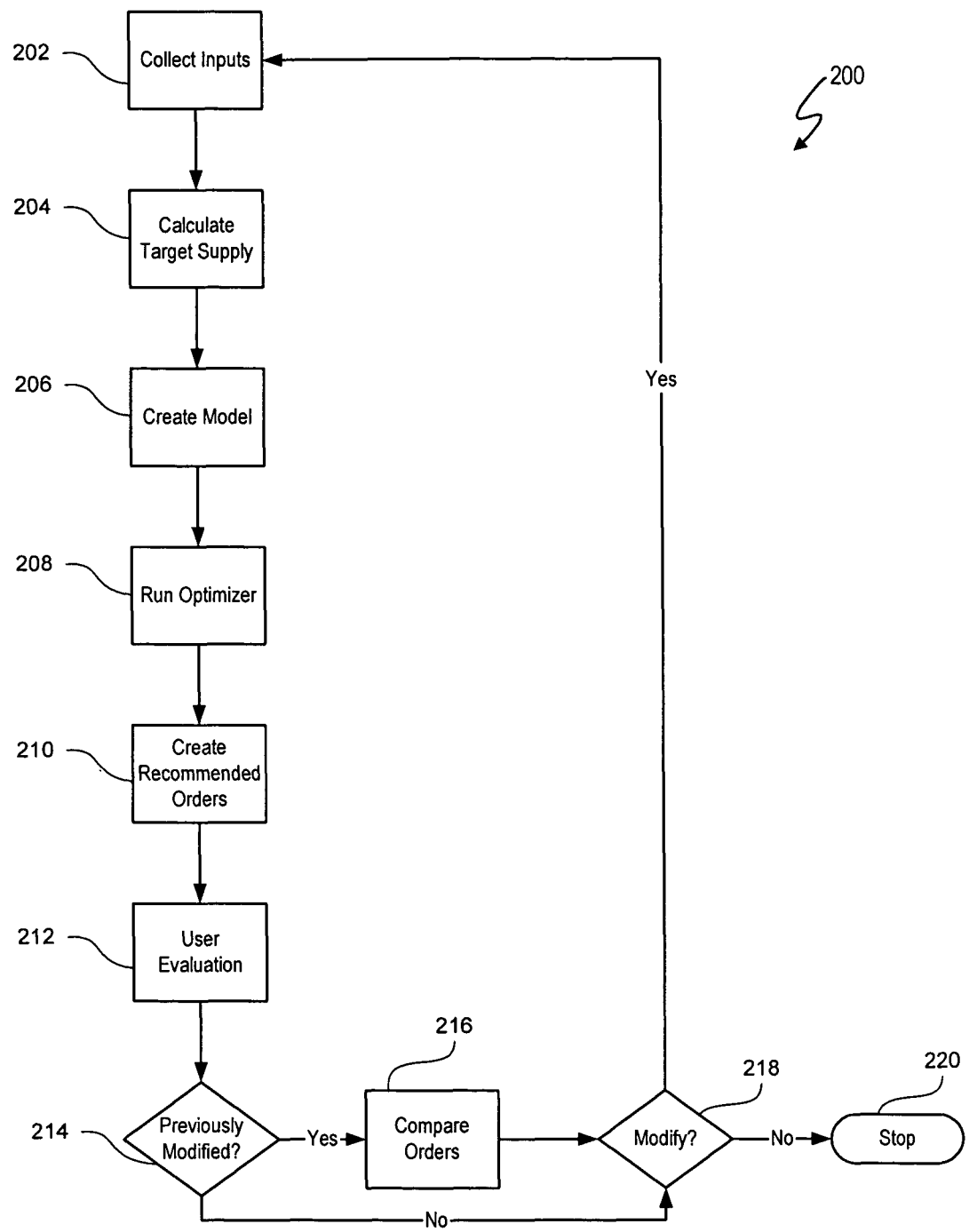
FIG. 2 depicts a multi-dimensional recommended order process used by the multi-dimensional recommended order system of FIG. 1.

Referring to FIGS. 1 and 2, in at least one embodiment, the recommended order engine 102 determines a recommended order for each product configuration in accordance with multi-dimensional recommended order process 200 depicted in FIG. 2. The recommended order is determined so that the future supply quantity of all product configurations $C_i$ closely matches future actual demand. The future supply quantity of each product configuration $C_i$ is determined in accordance with:

Future Supply Quantity ($FSQC_i$)=[Current Supply Quantity ($CSQC_i$)+Current Orders ($COC_i$)−Predicted Sales ($PSC_i$)+Recommended Order ($ROC_i$)].   [Equation 2]

where $FSQC_i$=Future Supply Quantity of configuration $C_i$, $CSQC_i$=Current Supply Quantity of configuration $C_i$, $COC_i$=Current Orders, $PSC_i$=Predicted Sales of configuration $C_i$, and $ROC_i$=Recommended Order of configuration $C_i$. The values for $CSQC_i$, $COC_i$, and $PSC_i$ are obtained from, for example, the manufacturer of a configuration $C_i$. The multi-dimensional recommended order process 200 initially determines a Future Supply Mix of configuration $C_i$, i.e. the percentage of configuration $C_i$ compared to the total number of manufactured configurations. The Future Supply Mix of configuration $C_i$ is determined in accordance with:

$$FSMC_i = \frac{FSQC_i}{\sum_{i=1}^{n} FSQC_i}$$   [Equation 3]

where $FSMC_i$=Future Supply Mix of configuration $C_i$. The Future Supply Quantity $FSQC_i$=$FSMC_i$ times the future sales volume of all configurations. Thus, once the Future Supply Mix of configuration $C_i$ is known, the recommended order for configuration $C_i$ ($ROC_i$) can be determined using Equation 1.

To determine the recommended order for each configuration $C_i$ ($ROC_i$), multi-dimensional recommended order process 200 in operation 202 collects the input data 104 used to determine the $ROC_i$. Operation 204 generates multi-dimensional target supply mixes by generating target supply mixes for each configuration $C_i$ and for each dimension $D_{j,z}$, where dimension $D_{j,z}$ represents the $j^{th}$ dimension having the $z^{th}$ dimension value, $j \in \{1, 2, \ldots, m\}$, and $z \in \{1, 2, \ldots, m\}$. The multi-dimensional target supply mixes are generated using a corroboration model 108. For each configuration $C_i$, the corroboration model 108 balances the sales metric data with demand data to determine a target supply mix. The exact weights to assign to sales metric data and demand data is a matter of design choice and generally depends on the perceived predictive accuracy of each piece of data.

Figure 4:
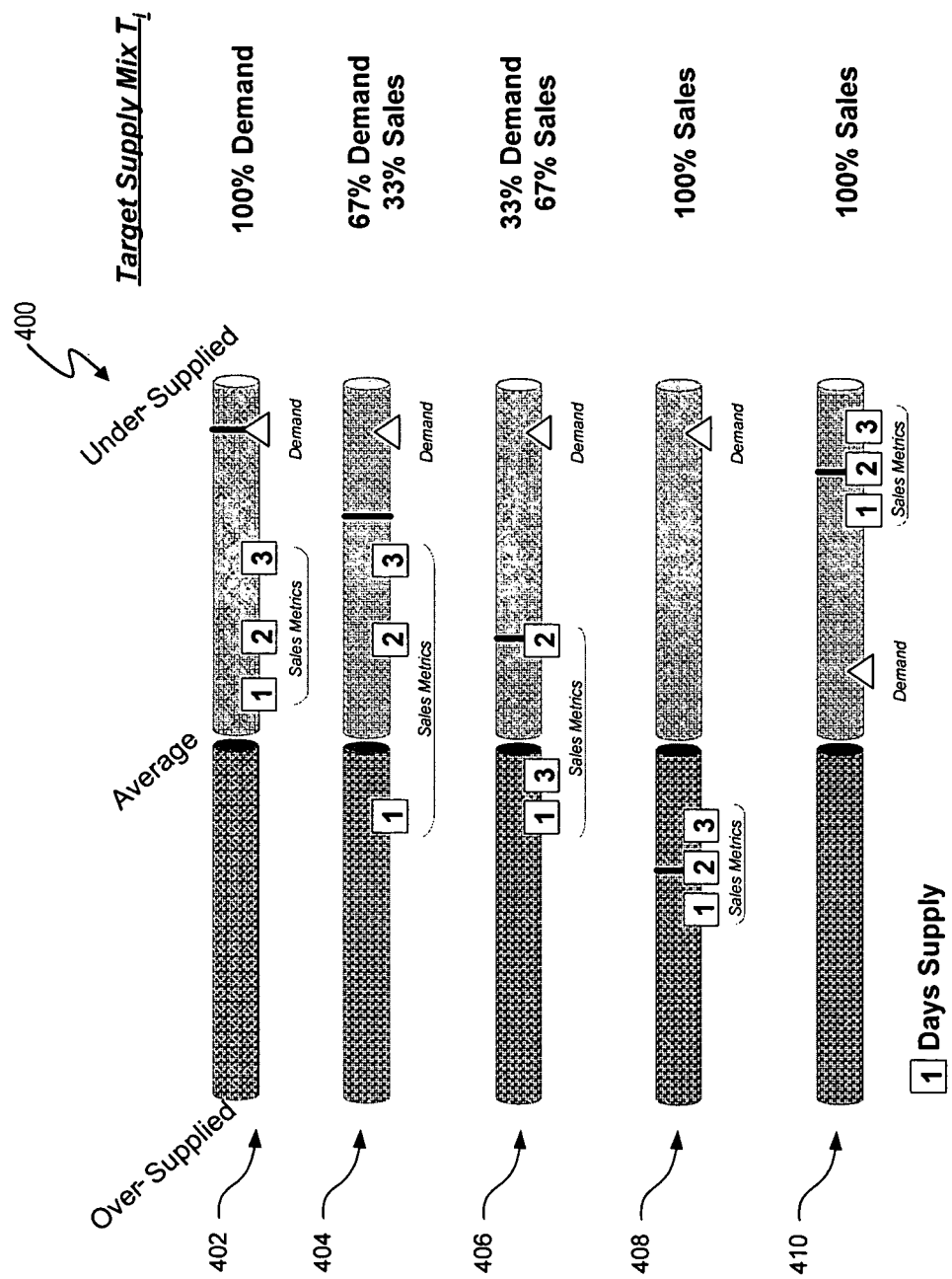
FIG. 4 depicts one embodiment of a corroboration model to determine a target supply mix.

FIG. 4 depicts corroboration model 400, which is one embodiment of corroboration model 108. The corroboration model 400 determines a future target supply mix $T_i$ for each configuration $C_i$ based on a level of corroboration between sales metrics and demand data. The corroboration model 400 moves the target supply mix $T_i$ toward the recommended demand mix as the sales metrics increase corroboration of the demand data. Corroboration model 400 utilizes three sales metrics, Days Supply, Average selling time, and Sales Efficiency. Corroboration model 400 includes corroboration rules 402-410 that give an equal weight to each of the three (3) sales metrics and assigns each sales metric weight to the demand data if the sales metric agrees with the demand data. "Agreement" can be a fixed definition or, in another embodiment, "Agreement" can be based on a continuous function. For example, agreement is determined if the sales metric corroborates the demand data relative to an average supply of the configuration $C_i$. For example, corroboration rule 402 assigns all sales metric weight to the demand data since all three sales metrics agree with the demand data, i.e. all three sales metrics and the demand data indicate an undersupply of configuration $C_i$. Thus, for corroboration rule 402 the target supply mix $T_i$=the supply mix indicated by the demand data. Corroboration rule 404 assigns 67% weight to the demand data and 33% to days supply goal data referenced by sales metric 1 since only sales metrics 2 and 3 agree with the demand data. Thus, for corroboration rule 404 the target supply mix $T_i$=67% indicated by the demand data and 33% to the days supply goal referenced by sales metric 1. The corroboration rules 406-410 are evaluated in the same manner. Corroboration model 400 includes additional corroboration rules for remaining potential values of the sales metric data and demand data.

Figure 5:
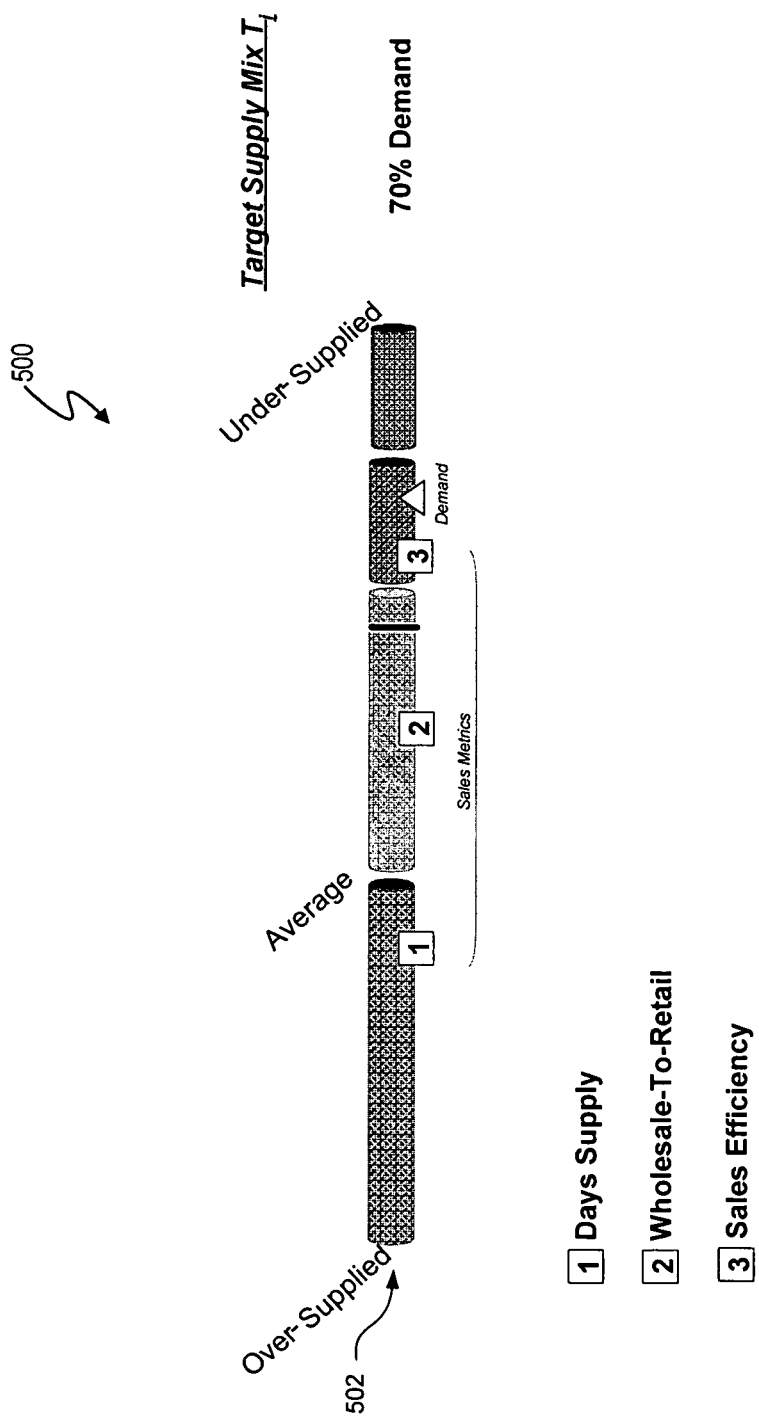
FIG. 5 depicts another embodiment of a corroboration model to determine a target supply mix.

FIG. 5 depicts corroboration model 500, which is another embodiment of corroboration model 108. Corroboration model 500 is a more sophisticated version of corroboration model 400. Corroboration rule 502 determines the target supply mix $T_i$ from the relative agreement of the sales metrics with the demand data.

A target supply mix $T_z$ is also determined for each dimension $D_z$ with dimension value $d_{z,j}$ (referred to as "dimension $D_{z,j}$"). Target supply mixes for each dimension $D_{z,j}$ are determined when a manufacturer's constraints specify that a certain proportion of configurations must have certain dimensions. For example, a manufacturer may specify that at least 15% of all trucks must be four wheel drive, at least 60% or all vehicles must have power windows, and so on. In one embodiment, sales metric information $M_{i,1}, \ldots, M_{i,j}$ is aggregated from each configuration that includes the dimension $D_{z,j}$. For example, if dimension $D_{z,j}$ is present on configurations $C_3$, $C_7$, and $C_{15}$, then for each sales metric the aggregated sales metric, $A_{i,j}$, equals $M_{3,j}$+$M_{7,j}$+$M_{15,j}$. Once the aggregated sales metric Aid is determined for each sales metric, the corroboration model 108 can be used to determine the dimension target supply mix $T_z$ for each dimension $D_{z,j}$. The future supply quantity and future supply mix of dimension $D_{x,j}$ are determined as in Equations 2 and 3, respectively, except that the current supply quantity, current orders, and predicted sales are determined by aggregating the occurrences of dimension $D_{x,j}$ for all product configurations $C_i$, $i=\{1, 2, \ldots, n\}$. The configuration target supply mix $T_i$ and the dimension target supply mix $T_z$ can be determined on a location-by-location basis by using local data. Locations can be as granular as the sales metric data and demand data allow. Generally, locations are broken down into regions, which can cover a geographic area the size of several states.

Once the target supply mixes $T_i$ and $T_z$ are determined, operation 206 generates an order model 110 that takes into account determined the target supply mixes $T_i$ and $T_z$ for each configuration $C_i$ and each dimension $D_z$. The order model 110 also takes into account the actual configurations $C_i$ that can be produced. Additionally, constraints can be entered into the order model 110. Some constraints are hard constraints that must be adhered to. For example, the number of V8 engines available would be a hard constraint in an automotive context. Other constraints may be soft constraints that have some flexibility. For example, the marketing department of a manufacturer may decide that 10% of all vehicles should include a moonroof. The constraint may have some flexibility within a certain range. Other types of constraints are regulatory constraints. For example, a regulatory constraint may be that the corporate average fuel economy ("CAFE") of all manufactured vehicles must by X mpg. Constraints may also vary by location. For example, at least Y % of all trucks must be delivered to region Z. Other examples are:
Example 1: Capacity to build only 1200 units with feature A
Example 2: Desire to have a minimum of 10% of feature B on all new configurations.
Example 3: Total automobile CAFE value of order must be between x and y.
Constraints can be written at regional levels to enforce marketing constraints
Example 1: 75% of configurations in region X should have feature C
Example 2: 25% of configurations in region Y with feature D should also have feature E.
Example 3: region Z requires configurations to be ordered at either 0 or greater than or equal to N.

In at least one embodiment, in order to keep orders from deviating wildly from period to period, e.g. month-to-month, the deviation of the $ROC_i$ from the previous period's $ROC_i$ should be limited to a level acceptable to a manufacturer and/or other impacted party(ies). Limiting such deviations is referred to as "pacing". Pacing can be modeled in accordance with:

$p_{low}*ROC_i$, previous period$<ROC_i<p_{high}*ROC_i$, current period
where:
$p_{low}$=factor<1 limiting the lower deviation from the current period $ROC_i$ to the previous period's $ROC_i$;
$p_{high}$=factor>1 limiting the upper deviation from the current period $ROC_i$ to the previous period's $ROC_i$; and In at least one embodiment, the complexity of the $ROC_i$ is also controlled with the order model 110 by limiting the number of different configurations ordered in accordance with:

Minimum number of configurations $C_i$≤number of configurations $C_i$ ordered≤Maximum number of configurations $C_i$. [Equation 4]

Order model 110 can be characterized mathematically to represent imbalances in product configurations and product dimensions. Imbalances represent a difference between a target supply and a future supply of a configuration and one or more dimensions. An example order model 110 is presented below:

$$\Sigma imbalance(C_i)^2 * K_i + \Sigma imbalance(D_{w,x}, D_{y,z})^2 * K_{w,x} K_{y,z} + \Sigma imbalance(D_{w,x})^2 * K_{w,x}).$$ [Equation 5]

wherein K is a weighting coefficient that is assigned to each imbalance in accordance with the relative importance of the imbalance, imbalance (Y)=target supply (Y)−future supply (Y), target supply (Y) is a constant calculated as discussed above, future supply (Y) equals Equation 2 for product configurations $C_i$. Equation 5 includes an imbalance between dimension pairs $D_{w,x}$, $D_{y,z}$. A valid dimension pair is a pair of dimensions that appear together on a product configuration $C_i$. Dimension pairs are generally used in Equation 5 when dimensions are not evenly distributed across all product configurations $C_i$ for all i={1, 2, . . . n}. An optimization engine generates recommended order values that minimize Equation 5. The Recommended Order Provisional Application describes the derivation of Equation 5. The values for the current supply, current orders, and predicted sales are generally provided by the business that will use the recommended order. Various constraints can be added to the order model 110, such as factory, marketing, and regulatory constraints. Pacing can also be included in the order model 110 to allow the target supply to approach the future supply at a desired rate.

All of the data in order model 110 is used to generate a quadratic program (QP) that creates a first pass at the recommended order $ROC_i$ for each configuration $C_i$. This QP is fed to an optimization engine 112 that is run in operation 208 and creates a set of values for all $ROC_i$ for each location. The optimization engine 112 uses the order model 110 as input and determines a value of $ROC_i$ that minimizes the numerical value of the order model 110.

The multi-dimensional recommended order system 100 also permits manual overrides 114 and optimization choices 116 to influence the output of the optimization engine 112. Example optimization choices 116 are maximize profitability and/or maximize sale of configurations with certain dimensions. The types of data described herein are only examples to illustrate capabilities of the multi-dimensional recommended order system 100 and multi-dimensional recommended order process 200 solution. The types of data that can be input and used by multi-dimensional recommended order system 100 and multi-dimensional recommended order process 200 are a matter of design choice that best fits the application context of the multi-dimensional recommended order system 100 and multi-dimensional recommended order process 200.

In operation 212, a user evaluates the recommended orders $ROC_i$ for all configurations $C_i$, i∈{1, 2, . . . , n}. If the recommended orders $ROC_i$ have been previously modified, operation 216 compares the current recommended orders $ROC_i$ with the other one or more previous recommended orders $ROC_i$. After operation 216, or after operation 214 if no prior modifications exist, the user can decide to accept the recommended orders $ROC_i$ and stop multi-dimensional recommended order process 200 in operation 220 or rerun multi-dimensional recommended order process 200 from operation 202 with modified input data 104, manual overrides 114, and/or optimization choices 116.

Figure 3:
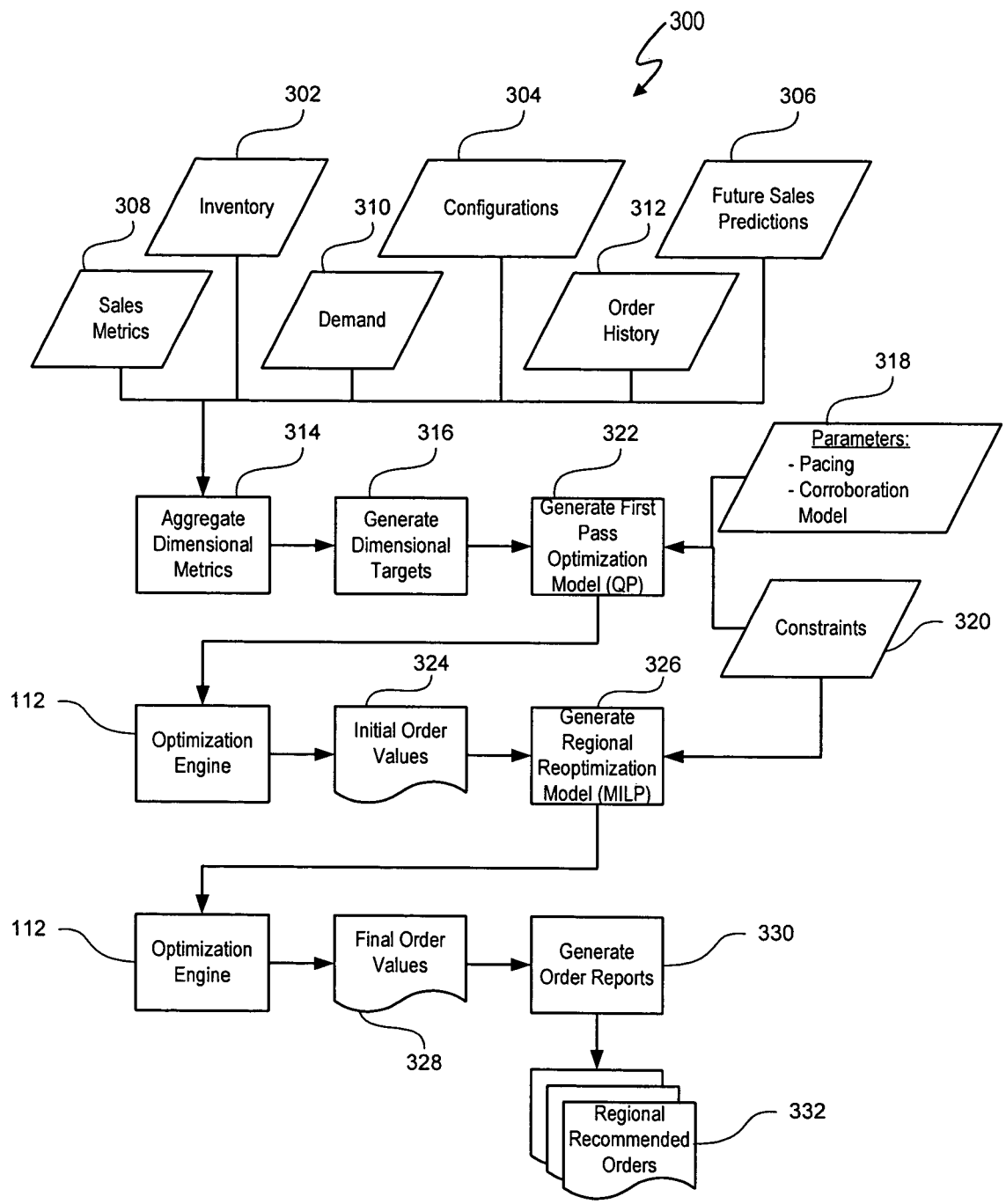
FIG. 3 depicts a more detailed embodiment of the multi-dimensional recommended order process of FIG. 2.

FIG. 3 depicts a multi-dimensional recommended order process 300, which is one embodiment of multi-dimensional recommended order process 200. The multi-dimensional recommended order process 300 processes a collection of input data to determine recommended orders for multiple product configurations. In one embodiment, the recommended orders are determined on a regional basis. For example, the recommended order for product configuration $C_i$ for region A may be X, the recommended order for the production configuration $C_i$ for region B may be Y, and so on, where X and Y represent the recommended order number for regions A and B, respectively. The input data for multi-dimensional recommended order process 300 is current product configuration inventory data 302, product configuration data 304 representing the product configurations available from a manufacturer, future sales predictions data 306 representing forecasted product configuration sales, sales metrics data 308 as described above, demand data 310 as described above, and order history data 312 representing information on past orders. Order history data 312 is useful, for example, to assist in determining recommended orders that pace the minimization of imbalances between future and target product configuration supplies.

The multi-dimensional recommended order process 300 not only determines recommended orders from product configurations as a whole, multi-dimensional recommended order process 300 also determines recommended orders using future and target supply data for dimensions of the product configurations. To determine target and future supply data for the dimensions, operation 314 generates aggregate dimensional metrics by breaking down input data for product configurations into data for individual dimensions and/or for groups of dimensions and then aggregating the data as described above. In one embodiment, a facilitating factor in determining target supply data on a multi-dimensional basis is the ability to utilize product configuration knowledge and input signals on a dimension-by-dimension resolution level as, for example, described in the Karipides Patent. Using the aggregate dimensional metrics, operation 316 generates the target supplies for dimensions as described above.

The input data is also used to generate production configuration future supply data as well as target supply data as described above. In addition to the input data, other parameters, such as parameters 318, can be used to influence the determination of recommended orders. For example, the pacing parameters and parameters from the corroboration model 108 can be used to respectively pace the minimization of imbalances between future and target supplies and determine the appropriate weighting of sales metrics and demand data. Additionally, constraints 320, such as factory constraints, marketing constraints, and regulatory constraints can also be used to appropriately affect the determination of recommended orders. The constraints and pacing constraints can be used to determine values of the weighting coefficient K in Equation 5. Thus, the input data is used in operation 322 to generate an optimization model in, for example, the form of a program that represents the quadratic Equation 5. Equation 5, in the form of a program appropriate for an optimization engine, is fed into optimization engine 112. The optimization engine 112 determines recommended orders that optimize Equation 5. In at least one embodiment, optimization engine 112 determines initial recommended orders 324 for each product configuration in each region so as to minimize the imbalances in Equation 5. In one embodiment, the initial recommended order values 324 are approximate because they only handle a subset of the constraints 320 and do not produce recommended order values with integer order values (e.g. the recommended order values may contain a fractional order amount 10.452 of product configuration $C_x$).

The initial recommended order values 324 from the first pass are used to generate a regional reoptimization model for each region in the form of a mixed integer linear program (MILP) 326. The MILP 326 satisfies the remaining constraints and creates integer values for all order quantities. Each regional MILP 326 program is given to optimization engine 112 to determine final, integer, recommended order values 328. Operation 330 aggregates the final recommended order values 328 into a report 332 containing the recommended orders for each region. The multi-dimensional recommended order process 300 is broken up into two steps to separately generate initial and final recommended order values in order to solve the problem in a reasonable amount of time. It is possible to combine the optimization model and the regional MILPs, although it has been observed that the combination takes more time for the optimization engine 112 to solve the problem.

Thus, the multi-dimensional recommended order system is used to develop recommended orders for complex product lines of products that have many valid feature combinations and different pricing for the feature combinations. In at least one embodiment, the multi-dimensional recommended order system paces the recommended order so that orders do not vary from each other outside of acceptable deviation margins. An optimization engine can optimize the recommended order in accordance with various goals including profitability. By utilizing the appropriate input data, constraints, pacing, and optimization, the multi-dimensional recommended order system generates an order that is valid, adheres to constraints: factory, marketing, regulatory, and is, thus, acceptable to the manufacturer.

Figure 6:
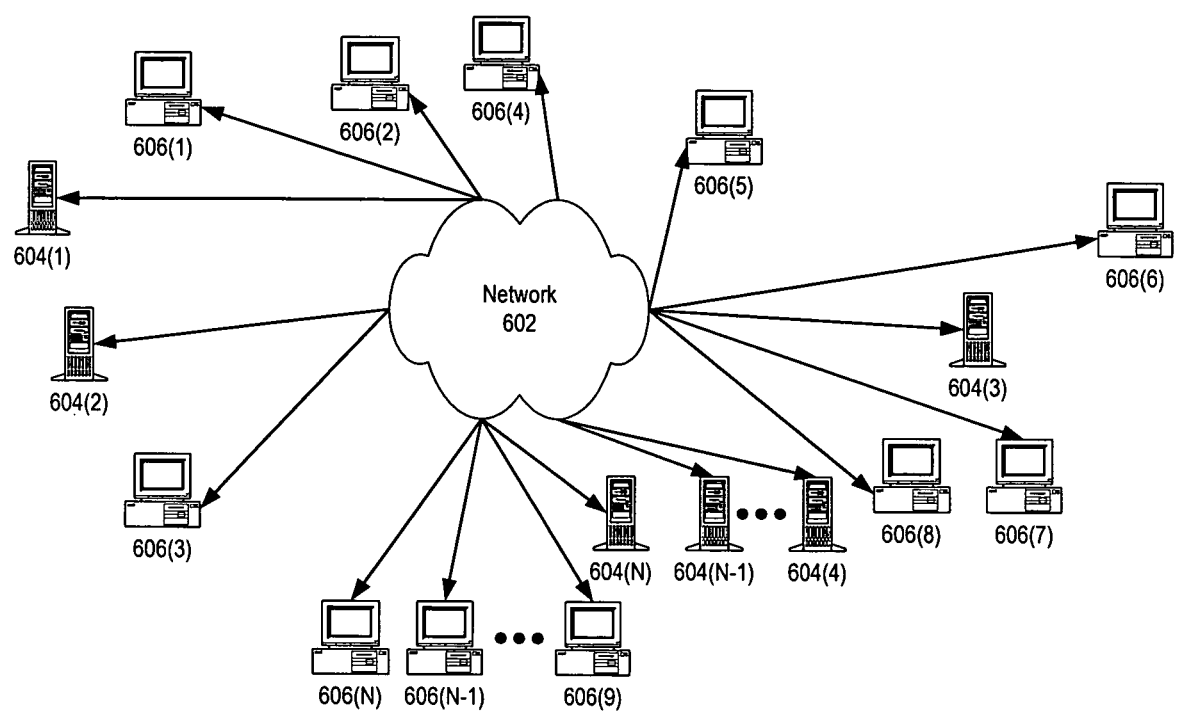
FIG. 6 depicts a block diagram illustrating a network environment in which multi-dimensional recommended order system and process can be practiced.

FIG. 6 is a block diagram illustrating a network environment in which a multi-dimensional recommended order system 100 and multi-dimensional recommended order process 200 may be practiced. Network 602 (e.g. a private wide area network (WAN) or the Internet) includes a number of networked server data processing systems 604(1)-(N) that are accessible by client data processing systems 606(1)-(N), where N is the number of server data processing systems connected to the network. Communication between client data processing systems 606(1)-(N) and server data processing systems 604(1)-(N) typically occurs over a network, such as a public switched telephone network over asynchronous digital subscriber line (ADSL) telephone lines or high-bandwidth trunks, for example communications channels providing T1 or OC3 service. Client data processing systems 606(1)-(N) typically access server data processing systems 604(1)-(N) through a service provider, such as an internet service provider ("ISP") by executing application specific software, commonly referred to as a browser, on one of client data processing systems 606(1)-(N).

Client data processing systems 606(1)-(N) and/or server data processing systems 604(1)-(N) may be, for example, data processing systems of any appropriate design, including a mainframe, a mini-computer, a personal data processing system including notebook computers, a wireless, mobile computing device (including personal digital assistants). These data processing systems are typically information handling systems, which are designed to provide computing power to one or more users, either locally or remotely. Such a data processing system may also include one or a plurality of input/output ("I/O") devices coupled to the system processor to perform specialized functions. Mass storage devices such as hard disks, compact disk ("CD") drives, digital versatile disk ("DVD") drives, and magneto-optical drives may also be provided, either as an integrated or peripheral device. One such example data processing system is shown in detail in Figure Y.

Figure 7:
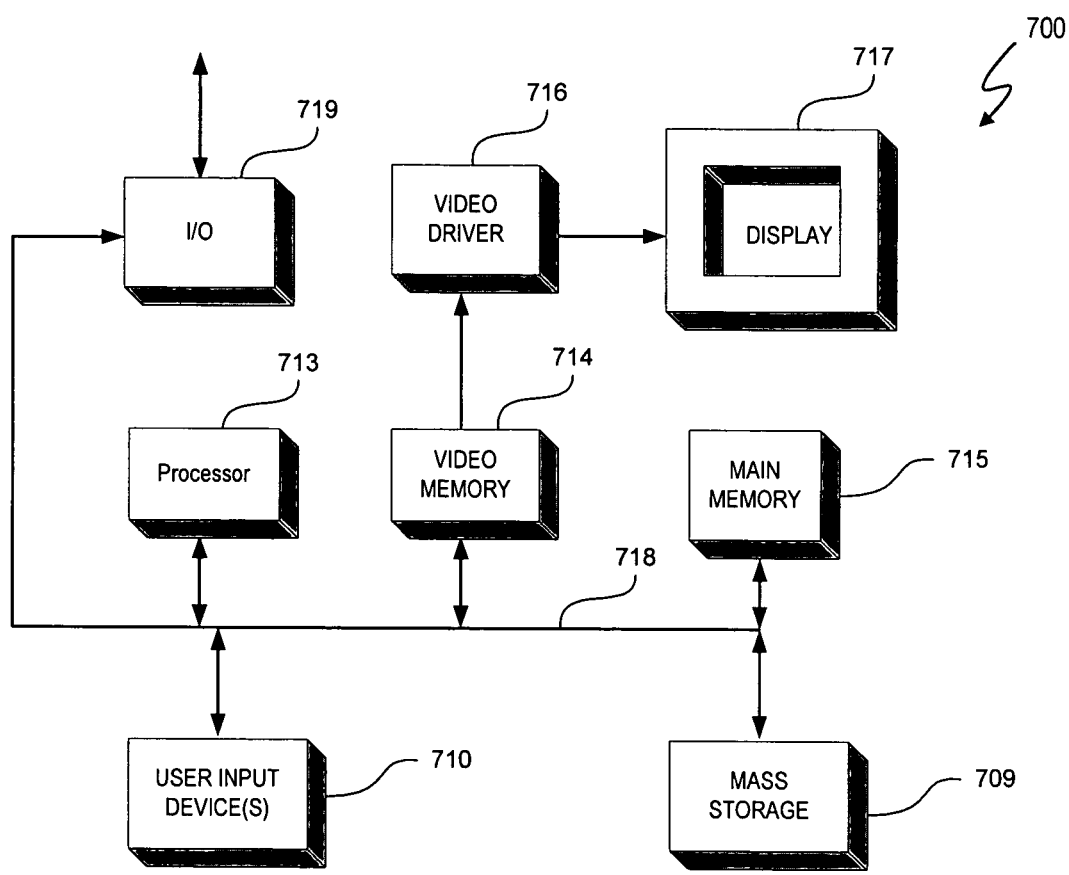
FIG. 7 depicts an example data processing system used in the network of FIG. 6.

Embodiments of the multi-dimensional recommended order system 100 and multi-dimensional recommended order process 200 can be implemented on a data processing system such as a general-purpose computer 700 illustrated in FIG. 7. Input user device(s) 710, such as a keyboard and/or mouse, are coupled to a bi-directional system bus 718. The input user device(s) 710 are for introducing user input to the data processing system and communicating that user input to processor 713. The data processing system of FIG. 7 generally also includes a video memory 714, main memory 715 and mass storage 709, all coupled to bi-directional system bus 718 along with input user device(s) 710 and processor 713. The mass storage 709 may include both fixed and removable media, such as other available mass storage technology. Bus 718 may contain, for example, 32 address lines for addressing video memory 714 or main memory 715. The system bus 718 also includes, for example, an n-bit data bus for transferring DATA between and among the modules, such as CPU 709, main memory 715, video memory 714 and mass storage 709, where "n" is, for example, 32 or 64. Alternatively, multiplex data/address lines may be used instead of separate data and address lines.

I/O device(s) 719 may provide connections to peripheral devices, such as a printer, and may also provide a direct connection to remote server data processing systems via a telephone link or to the Internet via an ISP. I/O device(s) 719 may also include a network interface device to provide a direct connection to remote server data processing systems via a direct network link to the Internet via a POP (point of presence). Such connection may be made using, for example, wireless techniques, including digital cellular telephone connection, Cellular Digital Packet Data (CDPD) connection, digital satellite data connection or the like. Examples of I/O devices include modems, sound and video devices, and specialized communication devices such as the aforementioned network interface.

Computer programs and data are generally stored as instructions and data in mass storage 709 until loaded into main memory 715 for execution. Computer programs may also be in the form of electronic signals modulated in accordance with the computer program and data communication technology when transferred via a network.

The processor 713, in one embodiment, is a microprocessor manufactured by Intel Corporation of California or Advanced Micro Devices of California. However, any other suitable single or multiple microprocessors or microcomputers may be utilized. Main memory 715 is comprised of dynamic random access memory (DRAM). Video memory 714 is a dual-ported video random access memory. One port of the video memory 714 is coupled to video amplifier 716. The video amplifier 716 is used to drive the display 717. Video amplifier 716 is well known in the art and may be implemented by any suitable means. This circuitry converts pixel DATA stored in video memory 714 to a raster signal suitable for use by display 717. Display 717 is a type of monitor suitable for displaying graphic images.

The data processing system described above is for purposes of example only. The multi-dimensional recommended order system 100 and multi-dimensional recommended order process 200 may be implemented in any type of data processing system or programming or processing environment. It is contemplated that the multi-dimensional recommended order system 100 and multi-dimensional recommended order process 200 might be run on a stand-alone data processing system, such as the one described above. The multi-dimensional recommended order system 100 and multi-dimensional recommended order process 200 might also be run from a server data processing systems system that can be accessed by a plurality of client data processing systems interconnected over an intranet network. Finally, the multi-dimensional recommended order system 100 and multi-dimensional recommended order process 200 may be run from a server data processing system that is accessible to clients over the Internet.

Many embodiments of the present invention have application to a wide range of industries including the following: computer hardware and software manufacturing and sales, professional services, financial services, automotive sales and manufacturing, telecommunications sales and manufacturing, medical and pharmaceutical sales and manufacturing, and construction industries.

Although the present invention has been described in detail, it should be understood that various changes, substitutions and alterations can be made hereto without departing from the spirit and scope of the invention as defined by the appended claims.

What is claimed is:

1. A method for generating recommended orders for configurable products, the method comprising:
  performing by a computer system programmed with code stored in a memory and executing by a processor of the computer system to configure the computer system into a machine for:
    accessing data factors for the configurable products and for dimensions of the configurations of the configurable products from which a recommended order for the configurable products is determined based on at least each configuration of the configurable products and the plurality of dimensions available for each configurable product, wherein the dimensions of the configurations of the configurable products include features of the configurable products, the dimensions have multiple values for each feature, and a plurality of the dimensions are included in more than one of the configurable products;
    processing the accessed data factors using a process that determines a target supply mix for the plurality of the dimensions;
    processing the accessed data factors using a process that determines a target supply mix for each of the configurable products;
    processing the target supply mixes for the plurality of dimensions and for each of the plurality of products using a process that determines the recommended order for the configurable products that optimizes imbalances between future supplies and target supplies of the configurable products and future supplies and target supplies of dimensions of the configurable products to minimize the imbalances, wherein determining the recommended order comprises:
      determining a future supply mix of each product configuration $C_i$ in accordance with:

$$FSMC_i = \frac{FSQC_i}{\sum_{i=1}^{n} FSQC_i}$$

where $FSMC_i$=Future Supply Mix of the product configuration $C_i$ and "i" is an element of the set $\{1, 2, \ldots, n\}$ and "n" represents the number of configurable products for which a recommended order is determined;
      determining a future supply quantity $FSQC_i$ wherein $FSQC_i$=$FSMC_i$ times future sales volume of all the configurations; and
      the recommended order=$FSQC_i$−(current supply quantity $C_i$+Order Pipeline for each product configuration $C_i$−Predicted Sales all for the product configuration $C_i$); and providing the recommended order to an ordering system to facilitate ordering.

2. The method of claim 1 wherein each dimension has a particular value selected from a set of one or more values.

3. The method of claim 1 further comprising:
including one or more constraints on the future supply of at least one of the product configurations prior to determining the recommended order or each product configuration.

4. The method of claim 3 wherein the constraints comprise one or more members of the group comprising constraints imposed by a factory that manufactures the product configurations, constraints imposed by an organization that markets the product configurations, and constraints imposed by governmental regulations.

5. The method of claim 1 wherein each product configuration is a vehicle configured with a unique combination of one or more dimensions, wherein each dimension has a particular value selected from a set of one or more values.

6. The method of claim 5 wherein each dimension comprises one or more members of the group comprising: a transmission, an exterior color, an interior color, a wheel size, an engine size, and a special collection of features.

7. The method of claim 1 further comprising:
performing by the computer system programmed with code stored in a memory and executing by a processor of the computer system to further configure the computer system into the machine for:
for each product configuration $C_i$:
determining a level of corroboration between sales metrics associated with a product configuration and actual demand data;
determining the target supply of each configurable product $C_i$ from the level of corroboration between sales metrics associated with a product configuration and actual demand data.

8. The method of claim 7 wherein the sales metrics comprise one or more members of the group comprising: (i) average selling time of each product configuration $C_i$, (ii) sales efficiency of each product configuration $C_i$, (iii) inventory age of each product configuration $C_i$, and (iv) days supply of each product configuration $C_i$.

9. The method of claim 1 wherein the recommended order for each product configuration is for a first geographic location, the method further comprising:
performing by the computer system programmed with code stored in a memory and executing by a processor of the computer system to further configure the computer system into the machine for:
for a plurality of additional locations, determining a recommended order for each product configuration that optimizes imbalances between the future supplies and the target supplies of the product configurations and the future supplies and the target supplies of the dimensions of the product configurations.

10. The method of claim 1 wherein the imbalances between future supplies and target supplies of dimensions of the product configurations are determined using pairs of dimensions included in at least two product configurations.

11. A system for generating recommended orders for configurable products, the system comprising:
a processor;
a memory, coupled to the processor, having code stored therein, the code being executable by the processor to configure a computer system into a machine for:
accessing data factors for the configurable products and for dimensions of the configurations of the configurable products from which a recommended order for the configurable products is determined based on at least each configuration of the configurable products and the plurality of dimensions available for each configurable product, wherein the dimensions of the configurations of the configurable products include features of the configurable products, the dimensions have multiple values for each feature, and a plurality of the dimensions are included in more than one of the configurable products;
processing the accessed data factors using a process that determines a target supply mix for the plurality of the dimensions;
processing the accessed data factors using a process that determines a target supply mix for each of the configurable products;
processing the target supply mixes for the plurality of dimensions and for each of the plurality of products using a process that determines the recommended order for the configurable products that optimizes imbalances between future supplies and target supplies of the configurable products and future supplies and target supplies of dimensions of the c configurable products to minimize the imbalances, wherein determining the recommended order comprises:
determining a future supply mix of each product configuration $C_i$ in accordance with:

$$FSMC_i = \frac{FSQC_i}{\sum_{i=1}^{n} FSQC_i}$$

where $FSMC_i$=Future Supply Mix of the product configuration $C_i$ and "i" is an element of the set $\{1, 2, \ldots, n\}$ and "n" represents the number of configurable products for which a recommended order is determined;
determining a future supply quantity $FSQC_i$ wherein $FSQC_i$=$FSMC_i$ times future sales volume of all the configurations; and
the recommended order=$FSQC_i$−(current supply quantity $C_i$+Order Pipeline for each product configuration $C_i$−Predicted Sales all for the product configuration $C_i$); and
providing the recommended order to an ordering system to facilitate ordering.

12. The system of claim 11 wherein each dimension has a particular value selected from a set of one or more values.

13. The system of claim 11 wherein the code further comprises code for:
including one or more constraints on the future supply of at least one of the product configurations prior to determining the recommended order or each product configuration.

14. The system of claim 13 wherein the constraints comprise one or more members of the group comprising constraints imposed by a factory that manufactures the product configurations, constraints imposed by an organization that markets the product configurations, and constraints imposed by governmental regulations.

15. The system of claim 11 wherein each product configuration is a vehicle configured with a unique combination of one or more dimensions, wherein each dimension has a particular value selected from a set of one or more values.

16. The system of claim 15 wherein each dimension comprises one or more members of the group comprising: a transmission, an exterior color, an interior color, a wheel size, an engine size, and a special collection of features.

17. The system of claim 11 wherein the code further comprises code for:
for each product configuration $C_i$:
determining a level of corroboration between sales metrics associated with a product configuration and actual demand data;
determining the target supply of each configurable product $C_i$ from the level of corroboration between sales metrics associated with a product configuration and actual demand data.

18. The system of claim 17 wherein the sales metrics comprise one or more members of the group comprising: (i) average selling time of each product configuration $C_i$, (ii) sales efficiency of each product configuration $C_i$, (iii) inventory age of each product configuration $C_i$, and (iv) days supply of each product configuration $C_i$.

19. The system of claim 11 wherein the recommended order for each product configuration is for a first geographic location, wherein the code further comprises code for:
for a plurality of additional locations, determining a recommended order for each product configuration that optimizes imbalances between future supplies and target supplies of product configurations and future supplies and target supplies of dimensions of the product configurations.

20. The system of claim 11 wherein the imbalances between future supplies and target supplies of dimensions of the product configurations are determined using pairs of dimensions included in at least two product configurations.

21. A non-transitory, computer readable medium comprising code stored therein, the code being executable by a processor to configure a computer system into a machine for:
accessing data factors for the configurable products and for dimensions of the configurations of the configurable products from which a recommended order for the configurable products is determined based on at least each configuration of the configurable products and the plurality of dimensions available for each configurable product, wherein the dimensions of the configurations of the configurable products include features of the configurable products, the dimensions have multiple values for each feature, and a plurality of the dimensions are included in more than one of the configurable products;
processing the accessed data factors using a process that determines a target supply mix for the plurality of the dimensions;
processing the accessed data factors using a process that determines a target supply mix for each of the configurable products;
processing the target supply mixes for the plurality of dimensions and for each of the plurality of products using a process that determines the recommended order for the configurable products that optimizes imbalances between future supplies and target supplies of the configurable products and future supplies and target supplies of dimensions of the configurable products to minimize the imbalances, wherein determining the recommended order comprises:
determining a future supply mix of each configuration $C_i$ in accordance with:

$$FSMC_i = \frac{FSQC_i}{\sum_{i=1}^{n} FSQC_i}$$

where $FSMC_i$=Future Supply Mix of product configuration $C_i$ and "i" is an element of the set $\{1, 2, \ldots, n\}$ and "n" represents the number of configurable products for which a recommended order is determined;
determining a future supply quantity $FSQC_i$ wherein $FSQC_i$=$FSMC_i$ times future sales volume of all the configurations; and
the recommended order=$FSQC_i$−(current supply quantity $C_i$+Order Pipeline for each product configuration $C_i$−Predicted Sales all for the product configuration $C_i$); and
providing the recommended order to an ordering system to facilitate ordering.

22. The computer readable medium of claim 21 wherein each dimension has a particular value selected from a set of one or more values.

23. The computer readable medium of claim 21 wherein the code further comprises code for:
including one or more constraints on the future supply of at least one of the product configurations prior to determining the recommended order or each product configuration.

24. The computer readable medium of claim 23 wherein the constraints comprise one or more members of the group comprising constraints imposed by a factory that manufactures the product configurations, constraints imposed by an organization that markets the product configurations, and constraints imposed by governmental regulations.

25. The computer readable medium of claim 21 wherein each product configuration is a vehicle configured with a unique combination of one or more dimensions, wherein each dimension has a particular value selected from a set of one or more values.

26. The computer readable medium of claim 25 wherein each dimension comprises one or more members of the group comprising: a transmission, an exterior color, an interior color, a wheel size, an engine size, and a special collection of features.

27. The computer readable medium of claim 21 wherein the code further comprises code for:
for each product configuration $C_i$:
determining a level of corroboration between sales metrics associated with a product configuration and actual demand data;
determining the target supply of each configurable product $C_i$ from the level of corroboration between sales metrics associated with a product configuration and actual demand data.

28. The computer readable medium of claim 27 wherein the sales metrics comprise one or more members of the group comprising: (i) average selling time of each product configuration $C_i$, (ii) sales efficiency of each product configuration $C_i$, (iii) inventory age of each product configuration $C_i$, and (iv) days supply of each product configuration $C_i$.

29. The computer readable medium of claim 21 wherein the recommended order for each product configuration is for a first geographic location, wherein the code further comprises code for:

for a plurality of additional locations, determining a recommended order for each product configuration that optimizes imbalances between future supplies and target supplies of product configurations and future supplies and target supplies of dimensions of the product configurations.

30. The computer readable medium of claim 21 wherein the imbalances between future supplies and target supplies of dimensions of the product configurations are determined using pairs of dimensions included in at least two product configurations.

31. An apparatus for generating recommended orders for configurable products, the apparatus comprising:
    means for accessing data factors for the configurable products and for dimensions of the configurations of the configurable products from which a recommended order for the configurable products is determined based on at least each configuration of the configurable products and the plurality of dimensions available for each configurable product, wherein the dimensions of the configurations of the configurable products include features of the configurable products, the dimensions have multiple values for each feature, and a plurality of the dimensions are included in more than one of the configurable products;
    means for processing the accessed data factors using a process that determines a target supply mix for the plurality of the dimensions;
    means for processing the accessed data factors using a process that determines a target supply mix for each of the configurable products;
    means for processing the target supply mixes for the plurality of dimensions and for each of the plurality of products using a process that determines the recommended order for the configurable products that optimizes imbalances between future supplies and target supplies of the configurable products and future supplies and target supplies of dimensions of the configurable products to minimize the imbalances, wherein determining the recommended order comprises:
    determining a future supply mix of each configuration product $C_i$ in accordance with:

$$FSMC_i = \frac{FSQC_i}{\sum_{i=1}^{n} FSQC_i}$$

where $FSMC_i$=Future Supply Mix of the product configuration $C_i$ and "i" is an element of the set {1, 2, . . . , n} and "n" represents the number of configurable products for which a recommended order is determined;
    determining a future supply quantity $FSQC_i$ wherein $FSQC_i$=$FSMC_i$ times future sales volume of all the configurations; and
    the recommended order=$FSQC_i$−(current supply quantity $C_i$+Order Pipeline for each product configuration $C_i$−Predicted Sales all for the product configuration $C_i$); and
    means for providing the recommended order to an ordering system to facilitate ordering.

32. The apparatus of claim 31 further comprising:
    means for including one or more constraints on the future supply of at least one of the product configurations prior to determining the recommended order or each product configuration.

33. The apparatus of claim 31 further comprising:
    for each product configuration $C_i$:
        means for determining a level of corroboration between sales metrics associated with a product configuration and actual demand data;
        means for determining the target supply of each configurable product $C_i$ from the level of corroboration between sales metrics associated with a product configuration and actual demand data.

* * * * *